United States Patent [19]
Costanza et al.

[11] Patent Number: 6,055,398
[45] Date of Patent: Apr. 25, 2000

[54] BELT TENSIONER APPARATUS

[75] Inventors: Daniel W. Costanza, Webster, N.Y.; Ssujan Hou, Cheshire, Conn.; Michael F. Leo, Penfield; Joseph M. Wing, Ontario, both of N.Y.

[73] Assignee: Xerox Corporation, Stamford, Conn.

[21] Appl. No.: 09/420,570

[22] Filed: Oct. 19, 1999

[51] Int. Cl.[7] .................................................. G03G 15/00
[52] U.S. Cl. ........................................................... 399/165
[58] Field of Search ....................... 399/165; 198/810.04, 198/816, 815, 813, 812; 242/417

[56] References Cited

U.S. PATENT DOCUMENTS

| | | | |
|---|---|---|---|
| 4,089,407 | 5/1978 | Bullivant | 198/815 |
| 4,206,994 | 6/1980 | Silverberg et al. | 198/810.04 |
| 5,257,071 | 10/1993 | Hediger | 399/165 |
| 5,641,058 | 6/1997 | Merten et al. | 198/810.04 |
| 5,708,924 | 1/1998 | Shogren et al. | 399/116 |
| 5,717,984 | 2/1998 | Wong | 399/165 |

*Primary Examiner*—Arthur T. Grimley
*Assistant Examiner*—Remmon R. Fordé

[57] ABSTRACT

A non-resilient belt tensioning mechanism monitors and maintains tension in a photoreceptor belt. The belt tensioning mechanism causes one of at least a pair of rollers, around which a photoreceptor belt is entrained, to exert pressure against the photoreceptor belt to apply and maintain substantially constant tension in the belt.

8 Claims, 3 Drawing Sheets

BELT TENSIONER APPARATUS

BACKGROUND OF THE INVENTION

Cross-reference is hereby made to copending and commonly assigned U.S. patent application Ser. No. 09/363,782 filed Jul. 29, 1999 and entitled Closed Loop Photoreceptor Belt Tensioner by Daniel W. Costanza et al.

The present invention relates generally to an electrostatographic printing machine, and more particularly, concerns improving color registration of images on a flexible photoreceptor within such a machine.

Flexible electrostatographic imaging members are well known in the art. Typical electrostatographic imaging members include, for example, photoreceptors for electrophotographic imaging systems and electroreceptors such as ionographic imaging members for electrographic imaging systems. These imaging members generally comprise at least a supporting substrate layer and at least one imaging layer comprising thermoplastic polymer matrix material. The "imaging layer" as employed herein is defined as the dielectric imaging layer of an electroreceptor or the photoconductive imaging layer of a photoreceptor. In a photoreceptor, the photoconductive imaging layer may comprise only a single photoconductive layer or a plurality of layers such as a combination of a charge-generating layer and a charge transport layer.

Although the discussions hereinafter focus only on flexible electrophotographic imaging members, nonetheless the problems encountered therewith are equally applicable to electrographic imaging members.

Generally, in the art of electrophotography, the process of electrophotographic copying is initiated by exposing a light image of an original document onto a substantially uniformly charged photoreceptive member. Exposing the charged photoreceptive member to a light image discharges a photoconductive surface thereon in areas corresponding to non-image areas in the original document while maintaining the charge in image areas, thereby creating an electrostatic latent image of the original document on the photoreceptive member. This latent image is subsequently developed into a visible image by depositing charged developing material onto the photoreceptive member surface such that the developing material is attracted to the charged image areas on the photoconductive surface. Thereafter, the developing material is transferred from the photoreceptive member to a receiving copy sheet or to some other image support substrate, to create an image, which may be permanently affixed to the image support substrate, thereby providing an electrophotographic reproduction of the original document. In a final step in the process, the photoconductive surface of the photoreceptive member is cleaned with a cleaning device, such as elastomeric cleaning blade, to remove any residual developing material, which may be remaining on the surface thereof in preparation for successive imaging cycles.

The electrostatographic copying process described hereinabove, for electrophotographic imaging, is well known and is commonly used for light lens copying of an original document. Analogous processes also exist in other electrostatographic printing applications such as, for example, digital laser printing where a latent image is formed on the photoconductive surface via a modulated laser beam, or ionographic printing and reproduction where charge is deposited on a charge retentive surface in response to electronically generated or stored images. One of the drawbacks to the above-described process utilizing a flexible imaging member belt is that the belt, a photoreceptor belt in particular, stretches during repeated use. This is due to the machine belt module design employing a number of backer bars and small diameter belt support rollers to support the photoreceptor belt for movement during electrophotographic image processing cycles and keeping the belt under tension at all times. The constant tension on the photoreceptor belt, the positioning of the backing bars, and the positioning of the small diameter rollers causes substantial belt fatigue through bending stress/strain build-up in the charge transport layer, promoting the onset development of premature charge transport layer stretching and cracking as a result of repetitions of the photoreceptor belt flexing over the small diameter belt support rollers and backer bars during machine cyclic photoreceptor belt function.

Stretching of the photoreceptor is considered to be a major mechanical failure since misregistration of color images during image-on-image printing manifests itself into copy print out defects.

Therefore there is a need for a photoreceptor belt tensioning system that achieves superior color registration while reducing belt tension during belt steering actuations.

PRIOR ART

The following disclosure may be relevant to certain aspects of the present invention:

U.S. Pat. No. 5,708,924

Patentee: Daniel K. Shogren et al.

Issued: Jan. 13, 1998

U.S. Pat. No. 5,708,924 is directed to a customer replaceable unit that includes a corner and support structure for supporting a photoreceptor belt while it is packaged, shipped and inserted over drive and idler rolls in a machine. It prevents a machine operator from having to handle the belt itself and provides protection from extrinsic damage. A machine is described that includes backer bars for tensioning the photoreceptor belt during use.

SUMMARY OF THE INVENTION

Accordingly, pursuant to the features of the present invention, a non-resilient tensioning mechanism is disclosed that sets and controls tension roll systems in photoreceptor belt modules, such as in electrophotographic printing machines. The tensioning mechanism acts on one of at least a pair of rollers around which a photorector belt is entrained to maintain substantially uniform tension as belt length varies.

BRIEF DESCRIPTION OF THE DRAWINGS

The foregoing and other features of the instant invention will be apparent and easily understood from a further reading of the specification, claims and by reference to the accompanying drawings in which:

Figure 1:
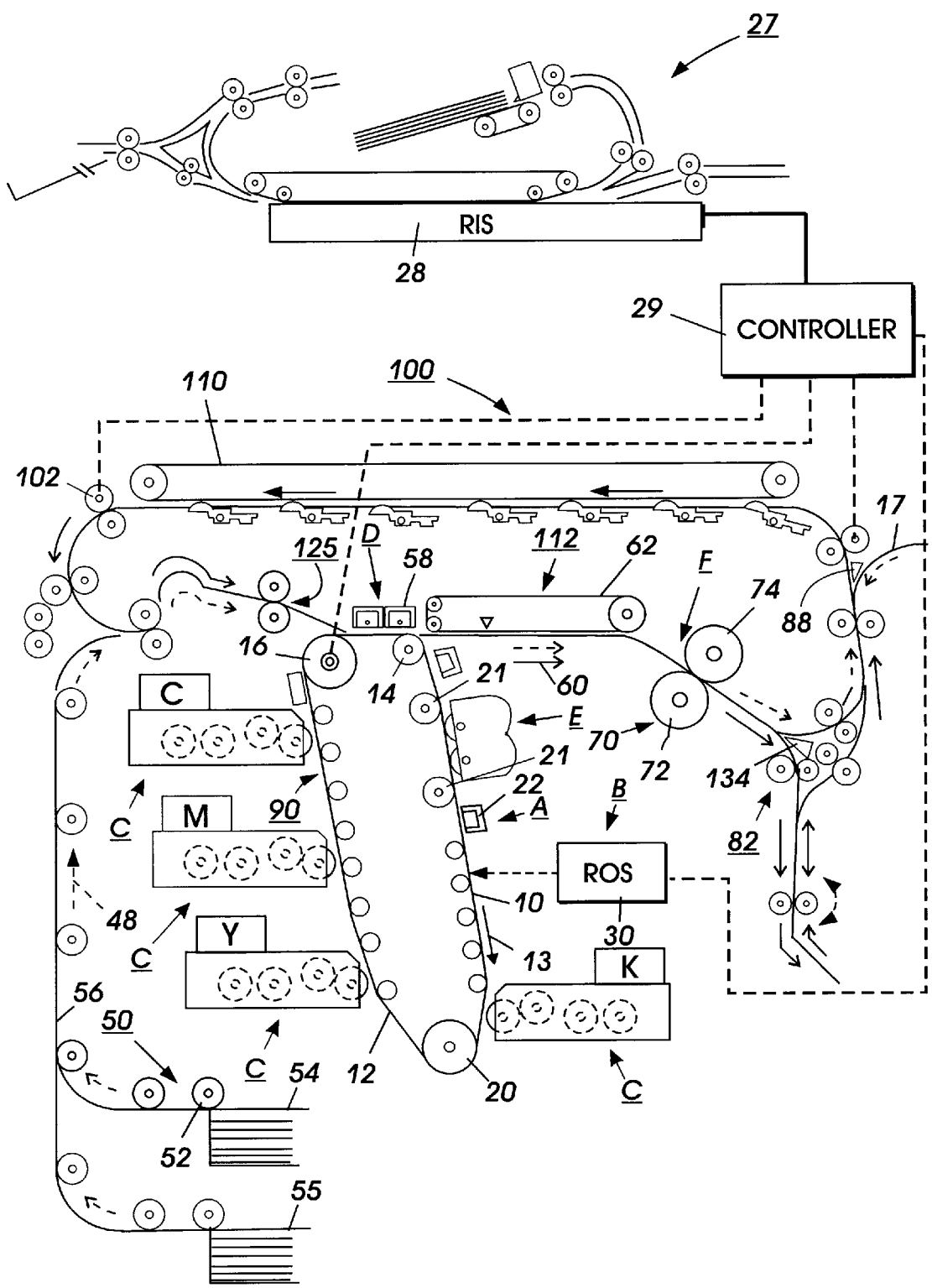
FIG. 1 is a schematic elevational view depicting the belt tensioning and detensioning scheme of the present invention in a printing machine.

All references cited in this specification, and their references, are incorporated by reference herein where appropriate for teaching additional or alternative details, features, and/or technical background.

While the present invention will be described hereinafter in connection with a preferred embodiment thereof, it should be understood that it is not intended to limit the invention to that embodiment. On the contrary, it is intended to cover all alternatives, modifications and equivalents as may be included within the spirit and scope of the invention as defined in the appended claims.

DETAILED DESCRIPTION OF THE INVENTION

For a general understanding of the features of the present invention, reference is made to the drawings. In the drawings, like reference numerals have been used throughout to identify identical elements.

FIG. 1 schematically illustrates an electrophotographic printing machine which generally employs a photoconductive belt 10 mounted on a belt support module 90. Preferably, the photoconductive belt 10 is made from a photoconductive material coated on a ground layer which, in turn, is coated on an anti-curl backing layer. Belt 10 moves in the direction of arrow 13 to advance successive portions sequentially through the various processing stations disposed about the path of movement thereof. Belt 10 is entrained about stripping roll 14, drive roll 16, tensioning roll 21, and idler roll 20. The details of the tensioning mechanism for tensioning roll 21 will be described hereinafter with reference to FIG. 2 and 3. As roll 16 rotates, it advances belt 10 in the direction of arrow 13.

Initially, a portion of the photoconductive belt surface passes through charging station A. At charging station A, a corona generating device indicated generally by the reference numeral 22 charges the photoconductive belt 10 to a relatively high, substantially uniform potential.

At an exposure station B, a controller or electronic subsystem (ESS), indicated generally be reference numeral 29, receives the image signals from RIS 28 representing the desired output image and processes these signals to convert them to a continuous tone or greyscale rendition of the image which is transmitted to a modulated output generator, for example the raster output scanner (ROS), indicated generally by reference numeral 30. Preferably, ESS 29 is a self-contained, dedicated microcomputer. The image signals transmitted to ESS 29 may originate from RIS 28 as described above or from a computer, thereby enabling the electrophotographic printing machine to serve as a remotely located printer for one or more computers. Alternatively, the printer may serve as a dedicated printer for a high-speed computer. The signals from ESS 29, corresponding to the continuous tone image desired to be reproduced by the printing machine, are transmitted to ROS 30. ROS 30 includes a laser with rotating polygon mirror blocks. Preferably a nine-facet polygon is used. The ROS 30 illuminates the charged portion on the surface of photoconductive belt 10 at a resolution of about 300 or more pixels per inch. The ROS will expose the photoconductive belt 10 to record an electrostatic latent image thereon corresponding to the continuous tone image received from ESS 29. As an alternative, ROS 30 may employ a linear array of light emitting diodes (LEDs) arranged to illuminate the charged portion of photoconductive belt 10 on a raster-by-raster basis.

After the electrostatic latent image has been recorded on photoconductive surface 12, belt 10 advances the latent image to a development station C, which includes four developer units containing c m y k toner, in the form of liquid or dry particles, is electrostatically attracted to the latent image using commonly known techniques. The latent image attracts toner particles from the carrier granules forming a toner powder image thereon.

With continued reference to FIG. 1, after the electrostatic latent image is developed, the toner powder image present on belt 10 advances to transfer station D. A print sheet 48 is advanced to the transfer station D, by a sheet feeding apparatus 50. Preferably, sheet feeding apparatus 50 includes a feed roll 52 contacting the uppermost sheet of stack 54. Feed roll 52 rotates to advance the uppermost sheet from stack 54 to vertical transport 56. Vertical transport 56 directs the advancing sheet 48 of support material into registration transport 125 past image transfer station D to receive an image from photoreceptor belt 10 in a timed sequence so that the toner powder image formed thereon contacts the advancing sheet 48 at transfer station D. Transfer station D includes a corona-generating device 58, which sprays ions onto the backside of sheet 48. This attracts the toner powder image from photoconductive surface 12 to sheet 48. After transfer, sheet 48 continues to move in the direction of arrow 60 by way of belt transport 62, which advances sheet 48 to fusing station F.

Fusing station F includes a fuser assembly indicated generally by the reference numeral 70 which permanently affixes the transferred toner powder image to the copy sheet. Preferably, fuser assembly 70 includes a heated fuser roller 72 and a pressure roller 74 with the powder image on the copy sheet contacting fuser roller 72. The pressure roller is crammed against the fuser roller to provide the necessary pressure to fix the toner powder image to the copy sheet. The fuser roll is internally heated by a quartz lamp (not shown). Release agent, stored in a reservoir (not shown), is pumped to a metering roll (not shown). A trim blade (not shown) trims off the excess release agent. The release agent transfers to a donor roll (not shown) and then to the fuser roll 72.

The sheet then passes through fuser 70 where the image is permanently fixed or fused to the sheet. After passing through fuser 70, a gate either allows the sheet to move directly via output 17 to a finisher or stacker, or deflects the sheet into the duplex path 100, specifically, first into single sheet inverter 82 here. That is, if the second sheet is either a simplex sheet, or a completed duplexed sheet having both side one and side two images formed thereon, the sheet will be conveyed via gate 88 directly to output 17. However, if the sheet is being duplexed and is then only printed with a side one image, the gate 88 will be positioned to deflect that sheet into the inverter 82 and into the duplex loop path 100, where that sheet will be inverted and then fed to acceleration nip 102 and belt transports 110, for recirculation back through transfer station D and fuser 70 for receiving and permanently fixing the side two image to the backside of that duplex sheet, before it exits via exit path 17.

After the print sheet is separated from photoconductive surface 12 of belt 10, the residual toner/developer and paper fiber particles adhering to photoconductive surface 12 are removed therefrom at cleaning station E. Cleaning station E includes a rotatably mounted fibrous brush in contact with photoconductive surface 12 to disturb and remove paper fibers and a cleaning blade to remove the nontransfered toner particles. The blade may be configured in either a wiper or doctor position depending on the application. Subsequent to cleaning, a discharge lamp (not shown) floods photoconductive surface 12 with light to dissipate any residual electrostatic charge remaining thereon prior to the charging thereof for the next successive imaging cycle.

Controller 29 regulates the various machine functions. The controller is preferably a programmable microprocessor, which controls all of the machine functions hereinbefore described. The controller provides a comparison count of the copy sheets, the number of documents being recirculated, the number of copy sheets selected by the operator, time delays, jam corrections, etc. The control of all of the exemplary systems heretofore described may be accomplished by conventional control switch inputs from the printing machine consoles selected by the operator. Conventional sheet path sensors or switches may be utilized to keep track of the position of the document and the copy sheets.

Figure 2:
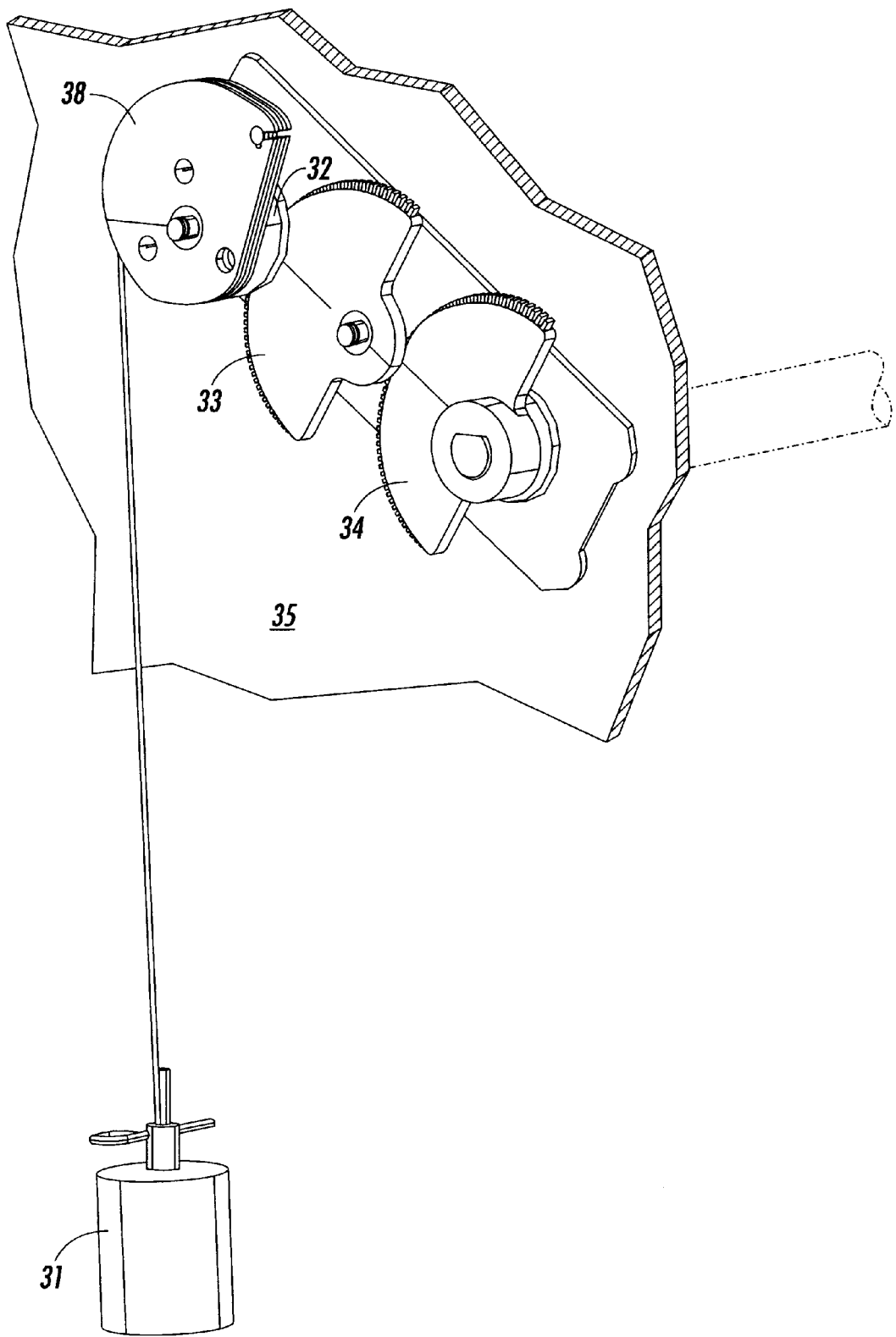
FIG. 2 illustrates a cam and gear train in an operational position.

Referring now to the subject matter of the tensioning mechanism for tension roll 21, FIG. 2 depicts the cam 38 in a tensioning position as it is slightly rotated by the weight 31, which controls the movement of cam 38 to precisely tension photoreceptor belt 10 into a tensioned image receiving position. The cam 38 was designed in conjunction with constant weight 31 to provide the proper force to be applied to the photoreceptor belt 10 to maintain a constant belt tension. At very low belt wrap angles, the required tension between tension roll 21 and the belt 10 is quite small At these angles a small amount of friction in the tensioning mechanism will significantly affect the tension applied to belt 10.

Cam 38 is fixedly connected to cam gear 32. Cam gear 32, idler gear 33 and tension gear 34 are rotatively supported on unit plate 35. The idler gear 33 engages the tension gear 34 and is engaged by the cam gear 32. The appropriate gear ratio increases the mechanical advantage of the weight required to apply the proper tension and reduces cam position sensitivity during tension control.

Figure 3:
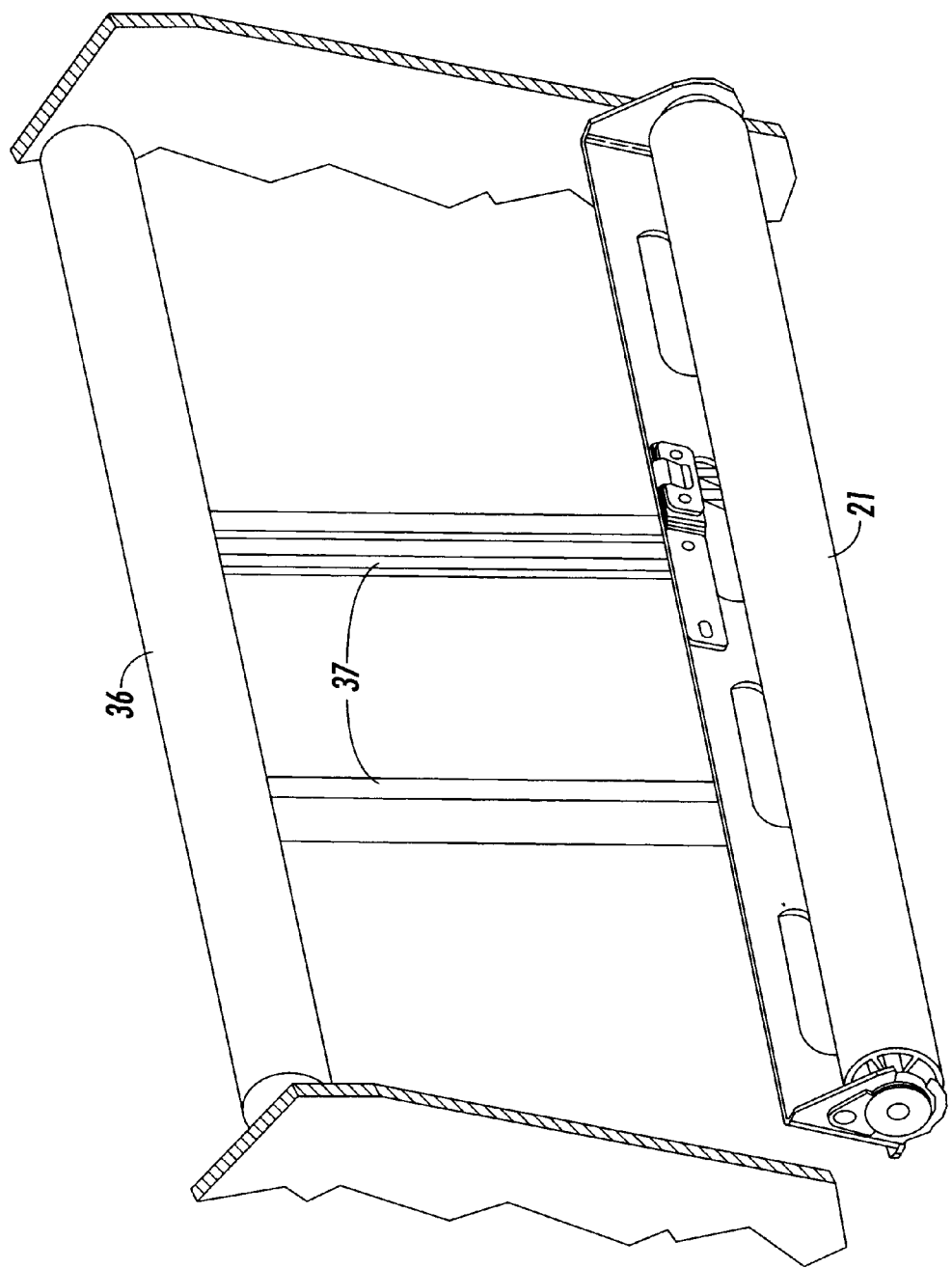
FIG. 3 is a partial view of a pivot arm and tension roll as mounted in a printing machine.

Referring now to FIG. 3, tension gear 34 is fixed to the shaft of pivot roll 36. Two pivot arms 37 are connected to pivot roll 36 and tension roll 21. When tension gear 34 rotates, the pivot arms 37 cause the tension roll 21 to apply tension to belt 10.

In operation a predetermined amount of tension is placed on photoreceptor belt 10 through downward movement of the weight 31, which causes counterclockwise rotation of cam 38 and cam gear 32. Cam gear 32 rotates the tension gear 34 counterclockwise via the idler gear 33. With rotation of tension gear 34, the pivot roll 36 rotates, causing pivot arms 37 to apply tension to the belt 10 via the tension roll 21.

To detension belt 10 for removal, cam 38 may be rotated in a clockwise direction, which lifts weight 31 and reverses the tensioning action of the pivot arms 37 and tension roll 21.

As can be appreciated, the length of the belt varies as a function of manufacturing tolerances and stretch during operation. The tensioning mechanism of the present invention not only sets the initial tension for operation of the belt, as described above, but also maintains the belt under substantially constant belt tension as the belt stretches. This is accomplished through the continued action of the constant weight acting to slightly rotate the cam and gear mechanism, thereby rotating the pivot arm which moves the tension roll against the belt to maintain belt tension as tension decreases through belt stretch. As the cam rotates, the cable acts on a different cam radius, thereby maintaining a constant tension as the photoreceptor belt length changes.

It should now be apparent that a non-resilient belt tensioner apparatus has been disclosed that sets and maintains tension on a photoreceptor belt to improve drive capacity if friction is reduced between the photoreceptor belt and a drive roll during operation.

While the invention has been described with reference to the structure herein disclosed, it is not confined to the details as set forth and is intended to cover any modification and changes that may come within the scope of the following claims.

What is claimed:

1. An apparatus for applying tension to an endless photoreceptor belt, comprising:

a pair of spaced apart rollers having the belt entrained thereabout; and a substantially non-resilient device operatively associated with one of said pair of rollers to maintain the belt under substantially constant tension as the belt length varies, with the non-resilient device comprising a pivot arm operatively connected to said one of said spaced apart rolls for applying tension on said belt, a shaft connected to said pivot arm, a cam, a weight associated with said cam, and a gear train which rotates said shaft in accordance with the clockwise or counterclockwise movement of said cam.

2. The apparatus of claim 1, wherein said non-resilient device maintains the belt at a tension of about 1.1 pounds per inch of belt width.

3. The apparatus of claim 1 wherein said pivot arm comprises a plurality of tension arms.

4. The apparatus of claim 1, wherein said cam comprises a variable radius cam, which has been designed to maintain constant belt tension independent of the belt length.

5. An electrophotographic printing machine of the type having an endless photoconductive belt entrained about a pair of spaced apart rollers, wherein the improvement comprises a substantially non-resilient device operatively associated with one of the pair of spaced apart rollers to maintain the belt with substantially uniform tension as the belt length varies, with the substantially non-resilient device comprising a pivot arm operatively connected to said one of said spaced apart rolls for applying tension on said belt, a shaft connected to said pivot arm, a cam, a weight associated with said cam, and a gear train which rotates said shaft in accordance with the clockwise or counterclockwise movement of said cam.

6. The printing machine according to claim 5, wherein said non-resilient device maintains the belt at a tension of about 1.1 pounds per inch of belt width.

7. The printing machine of claim 5, wherein said pivot arm comprises a plurality of tension arms.

8. The printing machine of claim 5, wherein said cam comprises a variable radius cam.

* * * * *